United States Patent
Vedantham et al.

(10) Patent No.: US 8,233,446 B2
(45) Date of Patent: Jul. 31, 2012

(54) SYSTEM AND METHOD FOR AN IMPROVED MBMS TO PSS HANDOVER

(75) Inventors: Ramakrishna Vedantham, Sunnyvale, CA (US); Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 664 days.

(21) Appl. No.: 12/363,642

(22) Filed: Jan. 30, 2009

(65) Prior Publication Data

US 2009/0316615 A1    Dec. 24, 2009

Related U.S. Application Data

(63) Continuation of application No. 12/141,854, filed on Jun. 18, 2008, now abandoned.

(60) Provisional application No. 60/945,080, filed on Jun. 19, 2007.

(51) Int. Cl.
*H04W 4/00* (2009.01)

(52) U.S. Cl. ........................ 370/329

(58) Field of Classification Search ............... None
See application file for complete search history.

(56) References Cited

U.S. PATENT DOCUMENTS

| | | | |
|---|---|---|---|
| 2006/0030312 A1 | 2/2006 | Han | |
| 2006/0072509 A1* | 4/2006 | Lindoff et al. | 370/332 |
| 2008/0311926 A1* | 12/2008 | Fischer et al. | 455/452.1 |
| 2011/0023071 A1* | 1/2011 | Li et al. | 725/87 |

FOREIGN PATENT DOCUMENTS

| | | |
|---|---|---|
| WO | WO 2004/072766 | 8/2004 |
| WO | WO2004072766 A2 | 8/2004 |
| WO | WO 2006/136203 | 12/2006 |

OTHER PUBLICATIONS

Office Action for European Application No. 08 763 353.3, dated Jun. 17, 2011.
Office Action for Korean Patent Application No. 10-2010-7001078, dated Apr. 19, 2011.
English translation for Office Action for Korean Patent Application No. 10-2010-7001078, dated Apr. 19, 2011.

(Continued)

*Primary Examiner* — Raj Jain
(74) *Attorney, Agent, or Firm* — Alston & Bird LLP

(57) ABSTRACT

A system and method for ensuring an improved transition at the application layer when distribution of media is changed from broadcast/multicast bearers to unicast bearers and vice versa. A mapping is defined between the timeline of a Packet-Switched Streaming Service (PSS) session and the Multimedia Broadcast Multicast Service (MBMS) session timeline. This mapping is used to enable the correct positioning of the stream in a PSS session by a PSS server after a handover has occurred. Broadcast multicast service center (BM-SC) signals can support various options for media playback after a MBMS-PSS handover in a PSS session description protocol (SDP) file or in the MBMS user service description (USD). In response, the client can signal its choice in the RTSP request that is sent when switching to the PSS session.

44 Claims, 7 Drawing Sheets

OTHER PUBLICATIONS

Multimedia Broadcast/Multicast Service (MBMS), 3GPP TS 26.346, V7.3.0, pp. 1-127, 2007.

3rd Generation Partnership Project; Technical Specification Group Services and System Aspects; Multimedia Broadcast/Multicast Service (MBMS); Protocols and codecs (Release 7). Mar. 29, 2007, pp. 1-128.

3rd Generation Partnership Project; Technical Specification Group Services and System Aspects; Transparent end-to-end Packet Switched Streaming Service (PSS); Protocol and codecs (Release 7). Mar. 29, 2007, pp. 1-131.

3rd Generation Partnership Project; Technical Specification Group Services and System Aspects; Multimedia Broadcast/Multicast Services (MBMS); Protocols and codecs (Release 7). Sep. 27, 2007, pp. 1-132.

International Search Report for PCT Application No. PCT/IB2008/052371 mailed Dec. 10, 2008.

* cited by examiner

SYSTEM AND METHOD FOR AN IMPROVED MBMS TO PSS HANDOVER

This application is a Continuation of U.S. application Ser. No. 12/141,854, filed Jun. 18, 2008 now abandoned, which claims priority from U.S. Provisional Application 60/945,080, filed Jun. 19, 2007, both of which are incorporated herein by reference in their entirety.

FIELD OF THE INVENTION

The present invention relates generally to the use of the Multimedia Broadcast/Multicast Service (MBMS). More particularly, the present invention relates to the handover of a MBMS session to a Packet-Switch Streaming (PSS) service.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, mobile broadcast solutions have been standardized by different organizations, such as the 3rd Generation Partnership Project (3GPP) MBMS. 3GPP MBMS enables resource-efficient delivery of multimedia content to the mobile users. A MBMS client can receive content via download delivery, streaming delivery, a combination of streaming delivery and download delivery, and/or other delivery methods.

MBMS is a 3GPP Release 6 (Rel-6) feature which may be deployed by operators only in a few areas where it is cost efficient to have the broadcast/multicast distribution of content. When MBMS subscribers move to other areas where there is no MBMS coverage, the operator may distribute the MBMS content in a unicast mode. However, application/transport layer signaling is required to ensure unicast mode reception of MBMS content to the subscribers while the subscribers are roaming in MBMS-outage areas.

Therefore, application/transport signaling and optimization techniques are needed for such scenarios. One of the objectives of the 3GPP SA4 Release 7 (Rel-7) work item on MBMS User Service Extensions is to specify the application/transport layer signaling needed for MBMS content distribution in unicast mode (over streaming and interactive bearers). Another objective is to specify optimization techniques for MBMS content delivery. Table 1 below shows the mapping between protocols to be used in broadcast/multicast and unicast modes as specified in MBMS Rel-7:

TABLE 1

| | Download only Delivery Method | Streaming only Delivery Method | Streaming + Download Delivery Methods |
|---|---|---|---|
| MBMS Content Distribution using Broadcast/Multicast Bearers | File Delivery over Unicast Transport (FLUTE)/User Datagram Protocol (UDP) | MBMS Streaming Framework Real-time Transport Protocol (RTP)/UDP for media transport RTP/UDP for Forward Error Correction (FEC) transport | MBMS Streaming Framework RTP/UDP for media transport RTP/UDP for FEC transport + FLUTE/UDP for file download |
| MBMS Content Distribution using Unicast Bearers (For roaming MBMS clients) | Open Mobile Alliance (OMA)-PUSH for File Delivery Table (FDT) transfer Hypertext Transfer Protocol (HTTP) GET requests for individual files | PSS Real-time Transport Session Protocol (RTSP) for session control RTP/UDP for media transport | PSS Enhancements (PSSe) RTSP for session control RTP for media transport FLUTE/UDP for file download in the same RTSP session |

When a MBMS client moves from a MBMS coverage area to an MBMS outage area, an ongoing MBMS streaming session is mapped onto a new PSS session. Unlike MBMS streaming sessions, PSS sessions provide session and media-level control to the client. The client can request the PSS transmission to start from any point on the media timeline by using the appropriate value in the Range header of the RTSP PLAY request.

Due to the change of bearers from MBMS to PSS, the client experiences an interruption in the media delivery. It is desirable that the user perceived interruption be minimized or controlled according to the user preferences. However, required signaling mechanisms are currently not defined in the current MBMS and PSS specifications.

FIG. 1 is a depiction of a hybrid MBMS-PSS service. As shown in FIG. 1, MBMS user equipment (UE) 110 receives the same service over MBMS bearers (when it is in an MBMS-coverage area) and over PSS bearers (when it is not in an MBMS coverage area). When the MBMS UE is roaming in an MBMS outage area, it receives the service over a unicast bearer from a PSS server 120. When the MBMS UE 110 is in a MBMS coverage area, it receives the service over an MBMS bearer from a broadcast multicast service center (BM-SC) 130. The BM-SC 130 and the PSS server 120 may be collocated or connected.

When the bearers change from MBMS to PSS, the media playback can start from any instant in the media timeline. As mentioned above, he precise instant in the media timeline depends on the Range header field of the RTSP PLAY request from the client. For example, the client can request media playback beginning with the precise instant where the media reception over MBMS bearers had stopped. Alternatively, the client can request media playback from the current instant of the media stream. In other scenarios, the client can request media playback from a few seconds before the instant where the media reception over MBMS bearers had stopped. FIGS. 2(a)-2(c) visually depict these different scenarios. In FIG. 2(a), media playback begins from the current instant of the media stream, resulting in the user not observing some of the media playback during the PSS setup delay. In FIG. 2(b), media playback begins with the precise instant where media reception over MBMS bearers had stopped. In FIG. 2c), media playback begins from a point before which media reception over MBMS bearers had stopped, resulting in a slight overlap in the media timeline. It should be noted that options other than these three presented scenarios are possible.

Some hybrid MBMS-PSS services might not support each of the above options. Additionally, even if a particular hybrid service supports all three options, the user may prefer to use one of these three options, or yet another option, (depending on the content type and personal preferences, for example). The support of different playback options might be signaled to the user, whose preference or choice is to be signaled to the BM-SC. In the current MBMS Rel-7 and PSS Rel-7 specifications, for example, the required signaling between the BM-SC and the MBMS UE is not specified.

As another example, the current version of the MBMS specification (i.e., 3GPP TS 26.346-740) considers the usage of the same synchronization source (SSRC) for the RTP streams of the corresponding media in both MBMS and PSS sessions. This ensures continuity in the sequence number and time-stamp series for the RTP packets received via MBMS and PSS bearers. However, this arrangement fails to consider the delays that are incurred during the PSS session setup phase which occur before the RTP/RTCP packet reception in PSS. This delay can be in the order of several seconds.

SUMMARY OF THE INVENTION

Various embodiments provide a system and method for ensuring a smooth and user-friendly transition at the application layer when distribution is changed from broadcast/multicast bearers to unicast bearers and vice versa. More particularly, various embodiments define a mapping between the timeline of a PSS session and the MBMS session timeline. This mapping is used to enable the correct positioning of the stream in a PSS session by a PSS server after a handover has occurred. In various embodiments, the service provider (e.g., BM-SC and PSS server) signals support of the various options for media playback after a MBMS-PSS handover in a PSS session description protocol (SDP) file or in the MBMS user service description (USD). The service provider may signal these options anytime before or during the MBMS streaming session using either broadcast/multicast bearers or interactive bearers, such as short message service (SMS) and hypertext transfer protocol (HTTP) by using Open Mobile Alliance (OMA) Push protocols. In response, a client signals its choice in the RTSP request that is sent when switching to the PSS session. The PSS server acknowledges the selected choice and sends the media accordingly.

These and other features of the various embodiments described herein, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
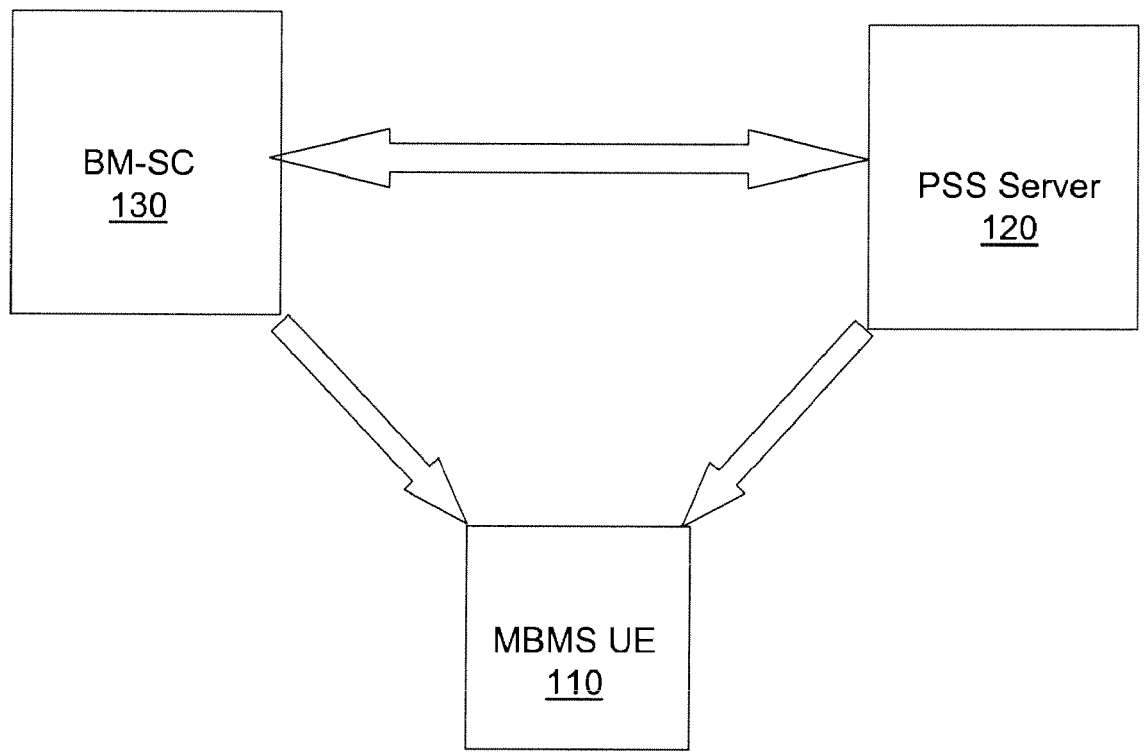
FIG. 1 is a representation of a hybrid MBMS-PSS service including a MBMS UE, a BM-SC and a PSS server.
Figure 2:
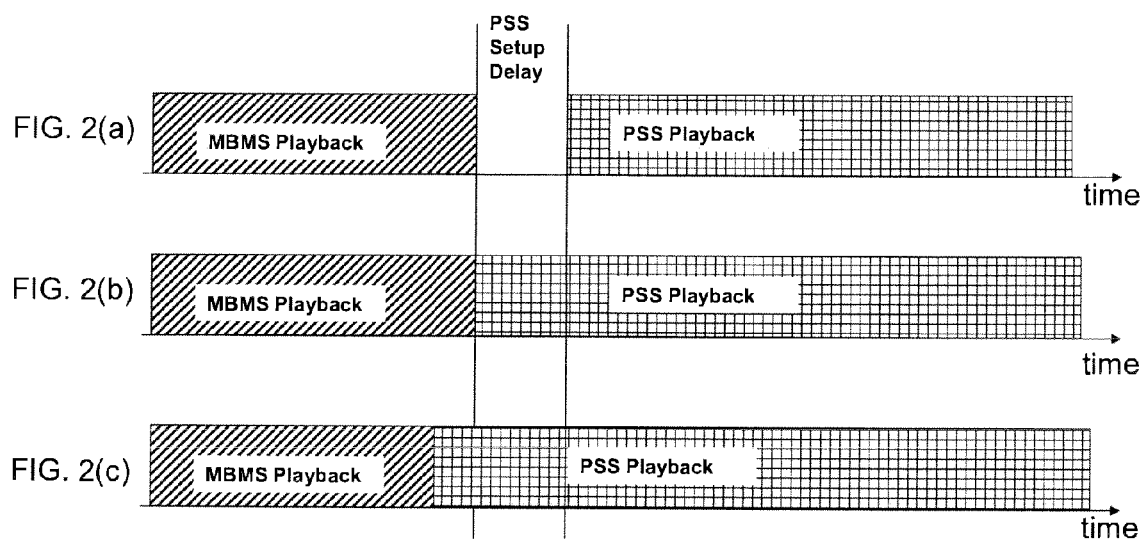
FIG. 2(a) a media playback process before and after a MBMS-PSS handover, where media playback begins from the current instant of the media stream.
FIG. 2(b) shows media playback beginning with the precise instant where media reception over MBMS bearers had stopped.
FIG. 2(c) shows media playback beginning from a point before which media reception over MBMS bearers had stopped.

Various embodiments provide a system and method for ensuring a smooth and user-friendly transition at the application layer when distribution is changed from broadcast/multicast bearers to unicast bearers and vice versa. More particularly, various embodiments define a mapping between the timeline of a PSS session and the MBMS session timeline. This mapping is used to enable the correct positioning of the stream in a PSS session by a PSS server after a handover has occurred. In various embodiments, the service provider (e.g., BM-SC and PSS server) signals support of the various options for media playback after a MBMS-PSS handover in a PSS session description protocol (SDP) file or in the MBMS user service description (USD). The service provider may signal these options anytime before or during the MBMS streaming session using either broadcast/multicast bearers or interactive bearers, such as SMS and HTTP by using OMA Push protocols. In response, the client signals its choice in the RTSP request that is sent when switching to the PSS session. For example, this choice can be indicated in the Range header of the RTSP PLAY request. The PSS server acknowledges the selected choice and sends the media accordingly.

The system and method described herein allows a smooth transition between MBMS to PSS in a hybrid MBMS-PSS service offering, and provides MBMS users with an option to receive and consume streaming content from the hand-off point or with the current flow of the MBMS streaming session. If the MBMS UE can identify an upcoming handover situation (due to the unavailability of MBMS bearers in the target cell, for example from radio layer or other lower layer signaling mechanisms), the MBMS UE can ensure uninterrupted media playback by initiating the PSS service prior to handoff.

It should be noted that although the mobile broadcast/multicast distribution system described herein is indicative of 3GPP MBMS while the unicast streaming service is indicative of 3GPP PSS, various embodiments of the present invention are not limited to implementation within/in conjunction with these standards/services. Various embodiments of the present invention are applicable to a plurality of different standards/services, for example, 3GPP2 standards, where 3GPP2 BCMCS is the 3GPP2 counterpart to 3GPP MBMS, and 3GPP2 MSS is the 3GPP2 counterpart to 3GPP PSS. Additionally, in certain systems/terminals the applicable broadcast/multicast distribution system can be Digital Video Broadcasting-Handheld IP Datacasting (DVB-H IPDC) or OMA BCAST and the unicast streaming service may be 3GPP PSS.

Moreover, referring back to Table 1, an MBMS user service may also utilize both a streaming delivery method and a download delivery method. When a user is in a MBMS-outage area, the service is mapped to a PSSe session, where a single RTSP session is used for session control for both streaming content (RTP/UDP) and downloadable content (FLUTE/UDP).

The following is a discussion of the implementation of particular embodiments of the present invention. The Normal Play Time (NPT) is set to 0 at the start time of the MBMS session. The MBMS session start time is taken from the SDP "t=" attribute or is otherwise indicated in the service guide or elsewhere.

Figure 3:
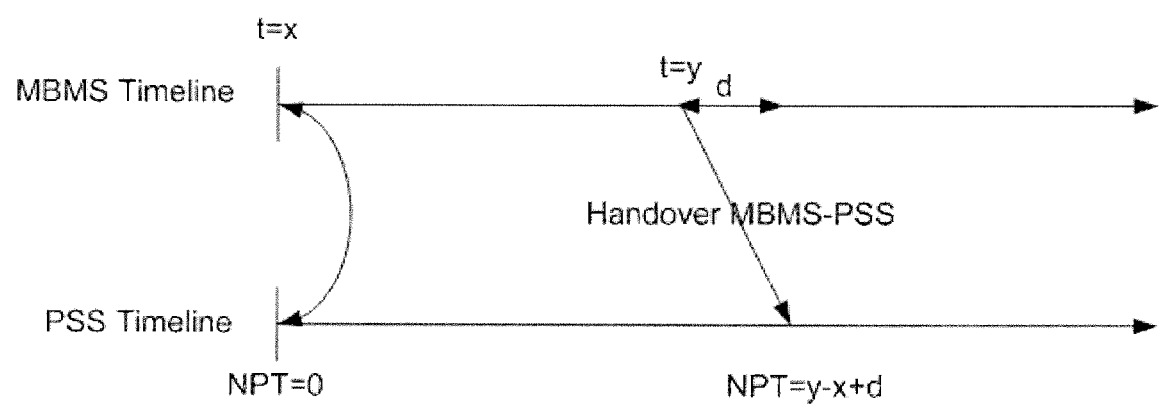
FIG. 3 is a representation of the mapping of a MBMS timeline to a PSS timeline.

FIG. 3 depicts the timeline mapping between MBMS and PSS according to various embodiments. As shown in FIG. 3, the MBMS timeline begins at t=x and continues until t=y, at which point a handover is initiated. The amount of time needed to complete the handover to PSS is referenced as d. The NPT at the completion of the handover is defined as y−x+d.

Figure 4A:
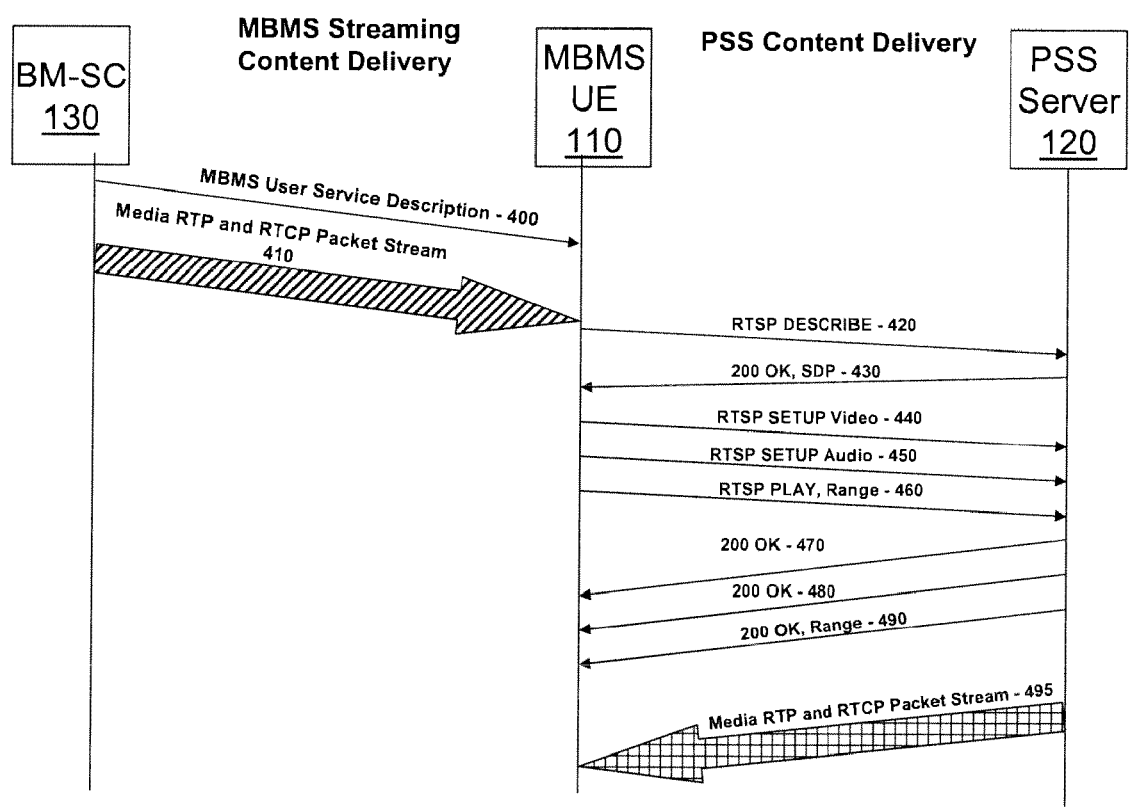
FIG. 4a shows the signaling involved in a hybrid MBMS-PSS service both before and after an handover according to one embodiment of the present invention.

FIG. 4a shows signaling involved in a hybrid MBMS-PSS service both before and after a handover according to one embodiment of the present invention. Before the start of the MBMS streaming service, the MBMS UE 110 receives a MBMS USD 400. The MBMS USD contains the SDP for the MBMS session, at least one unicastAccessURI (if it offers a unicast streaming service for roaming MBMS clients), as well as other service descriptors. When the MBMS UE 110 is in the MBMS-coverage area, it tunes into the MBMS streaming session at any time during the session, according to the standard MBMS procedures, and receives a media RTP and RTCP packet stream at 410 from the BM-SC 130.

At some later point during the MBMS streaming session, the MBMS UE 110 moves out of the MBMS-coverage area. At this point, the MBMS UE 110 would like to continue receiving the MBMS content over the unicast bearers, i.e., PSS bearers. The MBMS UE 110 sends a RTSP DESCRIBE message to the PSS server 120 at 420. In response, the MBMS UE 110 receives the SDP for a PSS session from the PSS server 120 at 430. The SDP can be obtained from a received unicastAccessURI which can comprise, for example a RTSP uniform resource locator (URL) for the PSS session or a link to the SDP file of the PSS session. Alternatively, the MBMS UE 110 may fetch the SDP of the PSS session well in advance of the handover to PSS, for example, while the MBMS UE 110 is still in the MBMS coverage area. In this scenario, the MBMS UE 110 may fetch the SDP from over interactive bearers (by accessing the unicastAccessURI), or the BM-SC 130 may also distribute the SDP over broadcast/multicast bearers.

In addition, the PSS server 120 may indicate the available options for media playback continuity. Two such options are entitled here as "GoWithFlow" and "Overlap." These options may be signaled to the client in the original MBMS USD (either as an external element or in the SDP fragment), in one or more of the updated instances of the MBMS USD, or in the SDP of the PSS session. The MBMS UE 110, depending on the user preferences and the UE's capabilities such as buffer size, chooses one of these options and indicates its choice in any one of the RTSP request methods used for initiating the PSS session.

Figure 4B:
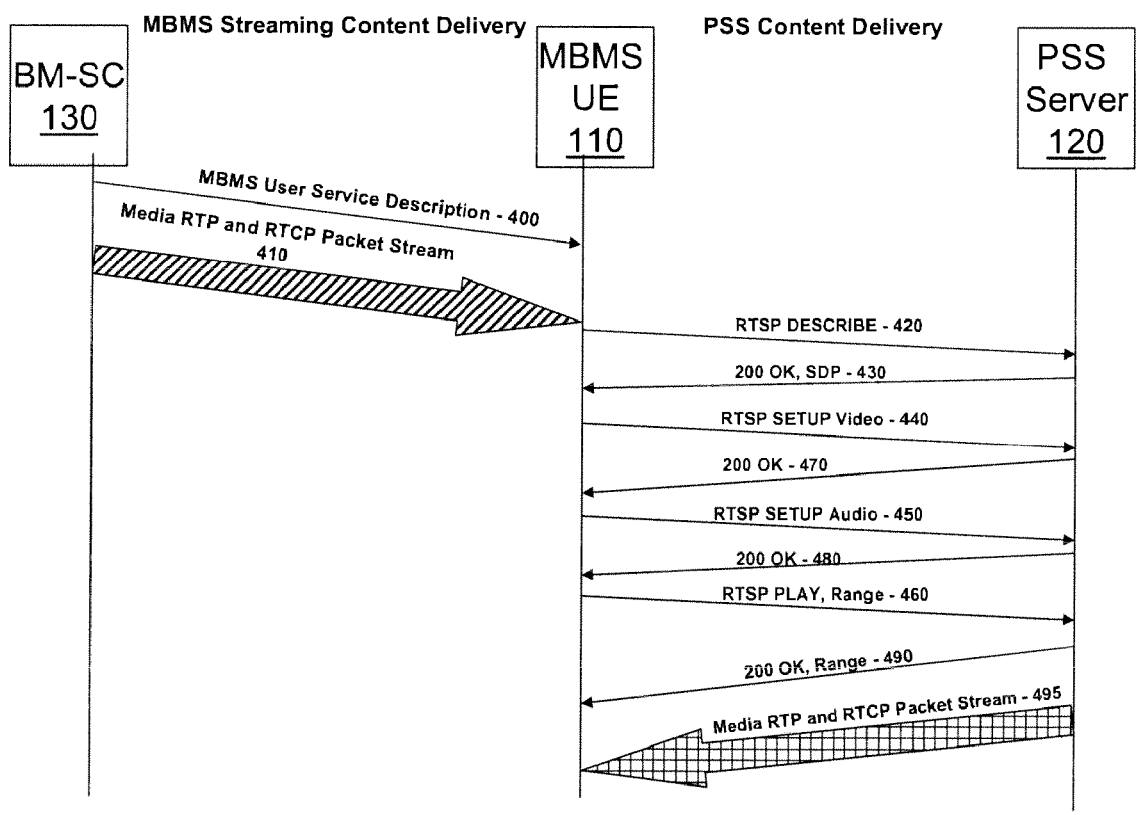
FIG. 4b shows the signaling involved in a hybrid MBMS-PSS server before and after a handover according to another embodiment of the present invention.

If the MBMS UE 110 uses the fast content switching (FCS) solution of PSS Rel-7 for startup, then it pipelines RTSP SETUP requests for individual media streams and the RTSP PLAY requests. If it uses the traditional manner of PSS Rel-6 start up, then it sends the SETUP requests for individual media streams (represented at 440 and 450) and the RTSP PLAY request (at 460) serially, as shown in FIG. 4b. In both cases, the MBMS UE 110 indicates its choice in the Range header field of the RTSP PLAY request. The RTSP SETUP requests are individually acknowledged at 470 and 480, respectively. The response to the RTSP PLAY request is represented at 490.

If the PSS server 120 accepts the request from the MBMS UE 110, then the PSS server 120 acknowledges the request by setting the Range header field in the RTSP PLAY response 490 to a value as close as possible to the receiver requested start time (deviations may occur because of timeline precision issues). The PSS server then starts streaming the content according to the client's request in a RTP and RTCP packet stream at 495. It is not necessary for the PSS server 120 to start at a key frame if it uses the same SSRC as the BM-SC 130. This allows for re-usage of the client buffer. If, on the other hand, the PSS server 120 rejects request of the MBMS UE 110, then the PSS server 120 signals its refusal by sending the value "now" in the Range header field of the RTSP PLAY response 490. The server then starts streaming the content according to its own choice. The MBMS UE 110 continues the media playback according to the received media. Depending on the capabilities of the MBMS UE 110, it may offer the user a choice to fast forward the content from where it left off to the current instant.

In the current specification, the BM-SC 130 indicates a set of unicastAccessURIs in the MBMS USD in order to improve the load balancing. Alternatively, the BM-SC 130 may allocate a set of unicastAccessURIs for supporting the GoWithFlow PSS service, and another set of unicastAccessURIs for supporting the Overlap PSS service. These two sets may be disjointed or joined together, i.e., a common set of unicastAccessURIs may support both GoWithFlow and Overlap PSS services. In this case, the MBMS UE 110 can directly indicate its choice by selecting the appropriate unicastAccessURI to initiate a PSS session.

The following is an example of the signaling of the time-shift capability of a PSS server in the MBMS User Service Description:

```
<?xml version="1.0" encoding="UTF-8"?>
<xs:schema xmlns="urn:3GPP:metadata:2007:MBMS:userServiceDescription"
xmlns:xs="http://www.w3.org/2001/XMLSchema"
```

-continued

```
targetNamespace="urn:3GPP:metadata:2007:MBMS:userServiceDescription"
elementFormDefault="qualified"> <xs:element name="initiationRandomization">
        <xs:complexType>
            <xs:attribute name="initiationStartTime" type="xs:unsignedInt" use="optional"/>
            <xs:attribute name="protectionPeriod" type="xs:unsignedInt" use="required"/>
            <xs:attribute name="randomTimePeriod" type="xs:unsignedInt" use="required"/>
        </xs:complexType>
    </xs:element><xs:element name="terminationRandomization">
        <xs:complexType>
            <xs:attribute name="protectionPeriod" type="xs:unsignedInt" use="required"/>
            <xs:attribute name="randomTimePeriod" type="xs:unsignedInt" use="required"/>
        </xs:complexType>
    </xs:element>
    <xs:element name="unicastAccessURI">
        <xs:complexContent>
            <xs:extension base="xs:anyURI">
            <xs:attribute name="timeShift" type="xs:boolean" use="optional" default="false"/>
        </xs:complexContent>
    </xs:element>
</xs:schema>
```

Using the modified USD schema, the following is an example of a USD with the signaling of the time-shift capability:

```
<?xml version="1.0" encoding="UTF-8"?>
<bundleDescription
    xmlns="urn:3GPP:metadata:2005:MBMS:userServiceDescription"
    xmlns:xsi="http://www.w3.org/2001/XMLSchema-instance"
    xmlns:r7="urn:3GPP:metadata:2007:MBMS:userServiceDescription">
    <userServiceDescription
    serviceId="urn:3gpp:1234567890MobileTVChannelBundleCh1">
        <deliveryMethod
sessionDescriptionURI="http://www.example.com/3gpp/mbms/channel1.-
sdp">
    <r7:unicastAccessURI
    timeShift="true">rtsp://www.example.com/3gpp/mbms/channel1.sdp
        </r7:unicastAccessURI>
    </userServiceDescription>
</bundleDescription>
```

During handover from MBMS to PSS, the MBMS UE 110 sets up a RTSP session with the PSS server 120. The following is an example of an RTSP PLAY request that indicates the desire of the receiver to make use of time shift functionality:

```
PLAY rtsp://mediaserver.com/movie.test/ RTSP/1.0
CSeq: 4
Session: dfhyrio90llk
Range: npt=2703.15-
User-Agent: TheStreamClient/1.1b2
RTSP/1.0 200 OK
CSeq: 4
Session: dfhyrio90llk
Range: npt=2703.12-
RTP-Info: url= rtsp://mediaserver.com/movie.test/streamID=0;
seq=9900;rtptime=4470048, url=
rtsp://mediaserver.com/movie.test/streamID=1;
seq=1004;rtptime=1070549
```

In order to probe the PSS server 120 for its support of the time shift functionality, a new feature tag may be defined under the name "3gpp-mbms-timeshift," for example. This feature tag may be used along with the "Supported" or "Require" header field. The signaling of the time shift functionality support may also be accomplished using the SDP in the reply to a DESCRIBE request. This may be accomplished by defining a new attribute "X-3gpp-mbms-timeshift," for example. The following is an example of the signaling in the SDP:

```
DESCRIBE rtsp://mediaserver.com/movie.test RTSP/1.0
CSeq: 1
User-Agent: TheStreamClient/1.1b2
Supported: 3gpp-mbms-timeshift
x-wap-profile: "http://uaprof.example.com/products/TheStreamClient1.-
1b2"
RTSP/1.0 200 OK
CSeq: 1Date: 20 Aug 2003 15:35:06 GMT
Content-Base: rtsp://mediaserver.com/movie.test/
Supported: 3gpp-mbms-timeshift
Content-Type: application/sdp
Content-Length: 500
v=0
o=– 950814089 950814089 IN IP4 144.132.134.67
s=Example of aggregate control of AMR speech and H.263 video
e=foo@bar.com
c=IN IP4 0.0.0.0
b=AS:77
b=TIAS:69880
t=0 0
a=X-3gpp-mbms-timeshift : 1
a=maxprate:20
a=range:npt=0-59.3478
a=control:*
m=audio 0 RTP/AVP 97
b=AS:13
b=TIAS:10680
b=RR:350
b=RS:300
a=maxprate:5
a=rtpmap:97 AMR/8000
a=fmtp:97 octet-align=1
a=control: streamID=0
a=3GPP-Adaptation-Support:2
m=video 0 RTP/AVP 98
b=AS:64
b=TIAS:59200
b=RR:2000
b=RS:1200
a=maxprate:15
a=rtpmap:98 H263-2000/90000
a=fmtp:98 profile=3;level=10
a=control: streamID=1
a=3GPP-Adaptation-Support:1
```

Figure 5:
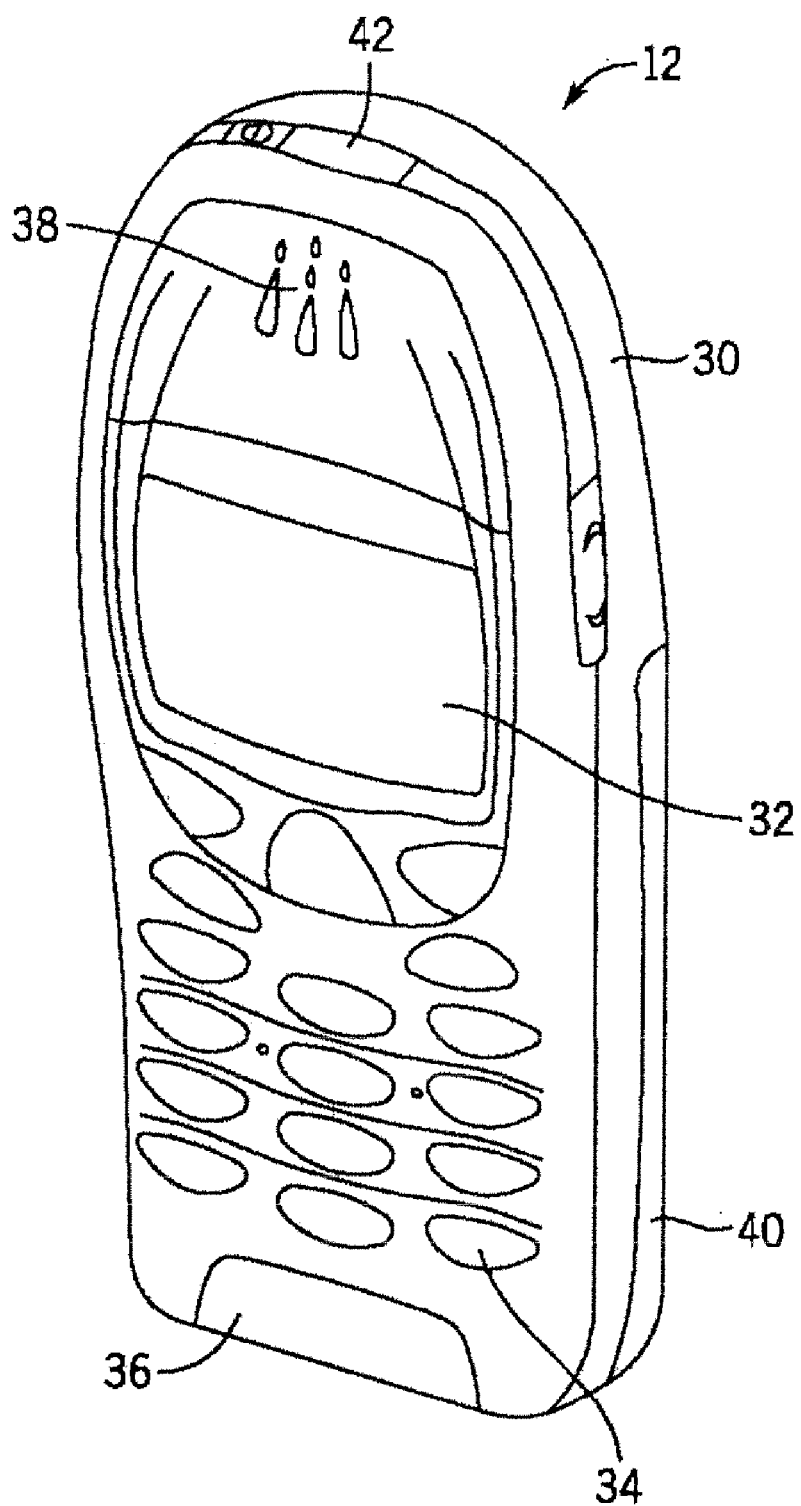
FIG. 5 is a perspective view of an electronic device that can be used in conjunction with the implementation of various embodiments.
Figure 6:
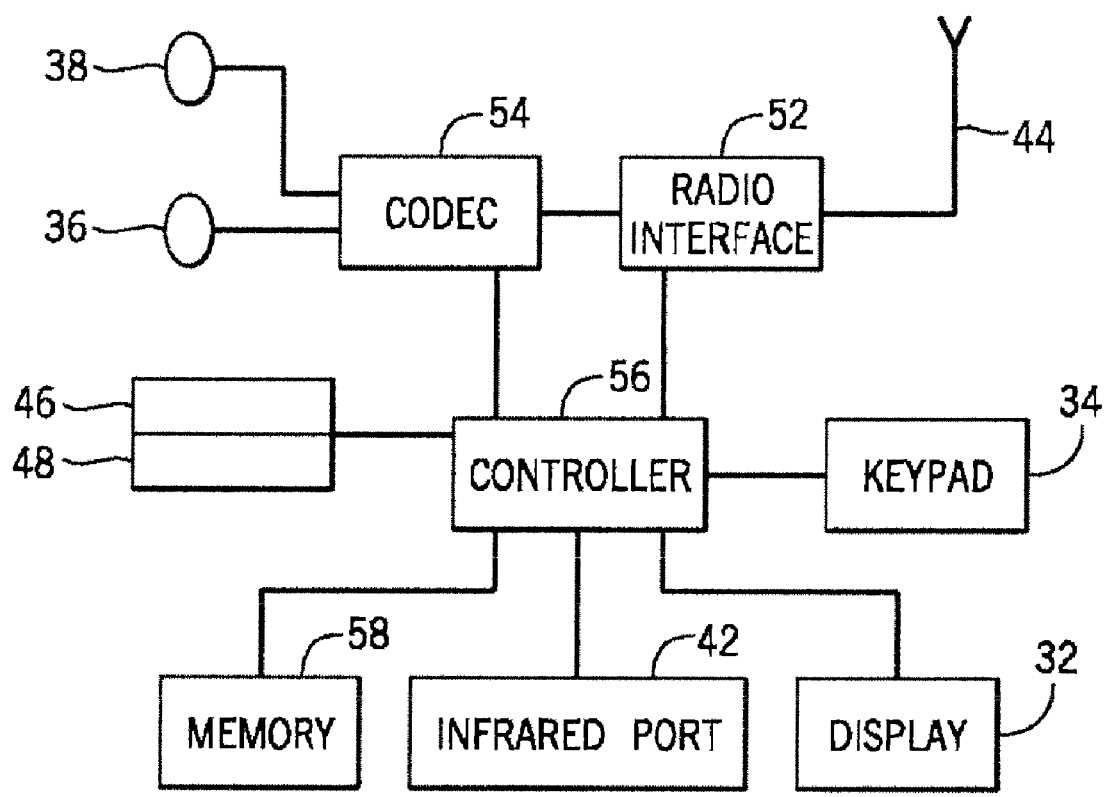
FIG. 6 is a schematic representation of the circuitry which may be included in the electronic device of FIG. 5.

FIGS. 4 and 5 show one representative electronic device 12 within which various embodiments of the present invention may be implemented. Each of the various devices described in the present application may contain one or more of the elements depicted in the electronic device 12 of FIG. 12. It should be understood, however, that the present invention is not intended to be limited to one particular type of electronic device 12. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, a memory 58 and a battery 80. Individual circuits and elements are all of a type well known in the art, for example in the Nokia range of mobile telephones.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Furthermore, the various embodiments of the present invention can be implemented within various networks, network elements, and servers of various service providers.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments have been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated.

What is claimed is:

1. A method of switching reception of media streams, comprising:
   receiving a Multimedia Broadcast Multicast Service (MBMS) streaming session;
   receiving session description information concerning a Packet-Switch Streaming (PSS) service session;
   after leaving a MBMS coverage area, sending a request to a PSS server to begin receiving the PSS session, beginning at a particular point in time of the PSS session; and
   if the request is accepted by the PSS server, receiving the PSS service session in accordance with the request.

2. The method of claim 1, wherein, if the request is not accepted by the PSS server, the PSS session is received in accordance with settings for the PSS server.

3. The method of claim 1, wherein the session description information is received in response to a session description information request, the session description information request sent while in a MBMS coverage area.

4. The method of claim 1, wherein the session description information is received in response to a session description information request, the session description information request sent after leaving a MBMS coverage area.

5. The method of claim 1, wherein the session description information is received from a broadcast multicast service center (BM-SC).

6. The method of claim 1, further comprising selecting one of a plurality of options for media playback continuity for the PSS session and notifying the PSS server of the selected option,
   wherein, if the request is accepted by the PSS server, the PSS session is received in accordance with the selected option.

7. The method of claim 6, wherein the plurality of options are identified in a received MBMS user service description (USD).

8. The method of claim 6, wherein the plurality of options are identified in the session description information for the PSS session.

9. The method of claim 6, wherein one of the plurality of options comprises receiving the PSS session beginning at a point in time when reception of the MBMS session had stopped.

10. The method of claim 6, wherein one of the plurality of options comprises receiving the PSS session beginning at a point in time before the point of time at which reception of the MBMS session had stopped.

11. The method of claim 6, wherein one of the plurality of options comprises receiving the PSS session beginning at a current instant of the PSS stream.

12. The method of claim 1, wherein the PSS service session comprises an enhanced PSS service session and the enhanced PSS service session is received via streaming and downloading processes.

13. A computer program product comprising at least one non-transitory computer-readable storage medium having computer-executable program code instructions stored therein for performing processes, the computer-executable program code instructions comprising computer code configured to perform the processes of claim 1.

14. An apparatus, comprising:
a processor; and
a memory unit communicatively connected to the processor and including:
computer code for processing a received Multimedia Broadcast Multicast Service (MBMS) streaming session;
computer code for processing received session description information concerning a Packet-Switch Streaming (PSS) service session;
computer code for, after leaving a MBMS coverage area, sending a request to the PSS server to begin receiving the PSS session, beginning at a particular point in time of the PSS session; and
computer code for, if the request is accepted by the PSS server, processing the received PSS session in accordance with the request.

15. The apparatus of claim 14, wherein, if the request is not accepted by the PSS server, the PSS session is received in accordance with settings for the PSS server.

16. The apparatus of claim 14, wherein the session description information is received in response to a session description information request.

17. The apparatus of claim 14, wherein the memory unit further comprises computer code for further comprising selecting one of a plurality of options for media playback continuity for the PSS session and notifying the PSS server of the selected option, wherein, if the request is accepted by the PSS server, the PSS session is received in accordance with the selected option.

18. The apparatus of claim 17, wherein the plurality of options are identified in a received MBMS user service description (USD).

19. The apparatus of claim 17, wherein the plurality of options are identified in the session description information for the PSS session.

20. The apparatus of claim 17, wherein one of the plurality of options comprises receiving the PSS session beginning at a point in time when reception of the MBMS session had stopped.

21. The apparatus of claim 17, wherein one of the plurality of options comprises receiving the PSS session beginning at a point in time before the point of time at which reception of the MBMS session had stopped.

22. The apparatus of claim 17, wherein one of the plurality of options comprises receiving the PSS session beginning at a current instant of the PSS stream.

23. An apparatus, comprising:
means for receiving a Multimedia Broadcast Multicast Service (MBMS) streaming session;
means for receiving session description information concerning a Packet-Switch Streaming (PSS) service session;
means for, after leaving a MBMS coverage area, sending a request to the PSS server to begin receiving the PSS session, beginning at a particular point in time of the PSS session; and
means for, if the request is accepted by the PSS server, receiving the PSS session in accordance with the request.

24. The apparatus of claim 23, further comprising means for selecting one of a plurality of options for media playback continuity for the PSS session and notifying the PSS server of the selected option,
wherein, if the request is accepted by the PSS server, the PSS session is received in accordance with the selected option.

25. A method of providing signaling information concerning the mapping of a Packet-Switch Streaming (PSS) service session to a Multimedia Broadcast Multicast Service (MBMS) session timeline, comprising:
receiving a request from a user equipment item to begin receiving the PSS session, beginning at a particular point in time of the PSS session; and
deciding whether to accept the request; and
if the request is accepted, sending the PSS session to the user equipment item in accordance with the request.

26. The method of claim 25, further comprising:
providing the user equipment item with a plurality of options for media playback continuity for the PSS session; and
receiving a selection notification of one of the plurality of options from the user equipment item,
wherein, if the request is accepted, the PSS session is sent in accordance with the selected option.

27. The method of claim 26, wherein the plurality of options are identified in the session description information for the PSS session.

28. The method of claim 26, wherein one of the plurality of options comprises receiving the PSS session beginning at a point in time when reception of the MBMS session had stopped.

29. The method of claim 26, wherein one of the plurality of options comprises receiving the PSS session beginning at a point in time before the point of time at which reception of the MBMS session had stopped.

30. The method of claim 26, wherein one of the plurality of options comprises receiving the PSS session beginning at a current instant of the PSS stream.

31. The method of claim 25, further comprising, if the request is accepted, setting a Range header field in a RTSP PLAY message to a value as close as possible to a requested start time for the PSS session.

32. The method of claim 1, wherein the PSS service session comprises an enhanced PSS service session and the sending of the enhanced PSS service session is accomplished via streaming and downloading processes.

33. A computer program product comprising at least one non-transitory computer-readable storage medium having computer-executable program code instructions stored therein for performing processes, the computer-executable program code instructions configured to perform the processes of claim 25.

34. An apparatus, comprising:
a processor; and
a memory unit communicatively connected to the processor and including:
computer code for processing a received request from a user equipment item to begin receiving a Packet-Switched Streaming Service (PSS) session, beginning at a particular point in time of the PSS session;
computer code for deciding whether to accept the request; and
computer code for, if the request is accepted, sending the PSS session to the user equipment item in accordance with the request.

35. The apparatus of claim 34, wherein the memory unit further comprises:
computer code for providing the user equipment item with a plurality of options for media playback continuity for the PSS session; and
computer code for processing a received selection notification of one of the plurality of options from the user equipment item, wherein, if the request is accepted, the PSS session is received in accordance with the selected option.

36. The apparatus of claim 35, wherein the plurality of options are identified in the session description information for the PSS session.

37. The apparatus of claim 35, wherein one of the plurality of options comprises receiving the PSS session beginning at a point in time when reception of the MBMS session had stopped.

38. The apparatus of claim 35, wherein one of the plurality of options comprises receiving the PSS session beginning at a point in time before the point of time at which reception of the MBMS session had stopped.

39. The apparatus of claim 35, wherein one of the plurality of options comprises receiving the PSS session beginning at a current instant of the PSS stream.

40. The apparatus of claim 35, wherein the memory unit further comprises computer code for, if the request is accepted, setting a Range header field in a RTSP PLAY message to a value as close as possible to a requested start time for the PSS session.

41. An apparatus, comprising:
means for receiving a request from a user equipment item to begin receiving a Packet-Switched Streaming Service (PSS) session, beginning at a particular point in time of the PSS session; and
deciding whether to accept the request; and
if the request is accepted, sending the PSS session to the user equipment item in accordance with the request.

42. The apparatus of claim 41, further comprising:
means for providing the user equipment item with a plurality of options for media playback continuity for the PSS session; and
means for receiving a selection notification of one of the plurality of options from the user equipment item,
wherein, if the request is accepted, the PSS session is received in accordance with the selected option.

43. A system, comprising:
a broadcast multicast service center (BM-SC);
a multimedia broadcast multicast service (MBMS) user equipment item configured to:
receive a MBMS streaming session from the BM-SC;
receive session description information concerning a Packet-Switched Streaming Service (PSS) session; and
a PSS server,
wherein the MBMS user equipment item is further configured to, after leaving a MBMS coverage area, send a request to the PSS server to begin receiving 11 the PSS session, beginning at a particular point in time of the PSS session, and wherein the PSS server is configured to:
decide whether to accept the request; and
if the request is accepted, send the PSS session to the user equipment item in accordance with the request.

44. The system of claim 43, wherein the MBMS user equipment is further configured to select one of a plurality of options for media playback continuity for the PSS session, and wherein the PSS server is further configured to, if the request is accepted, send the PSS session is received in accordance with the selected option.

* * * * *